Aug. 11, 1925.
J. BLACKBURN
GEAR SHIFT
Filed Oct. 29, 1923
1,549,707
2 Sheets-Sheet 1
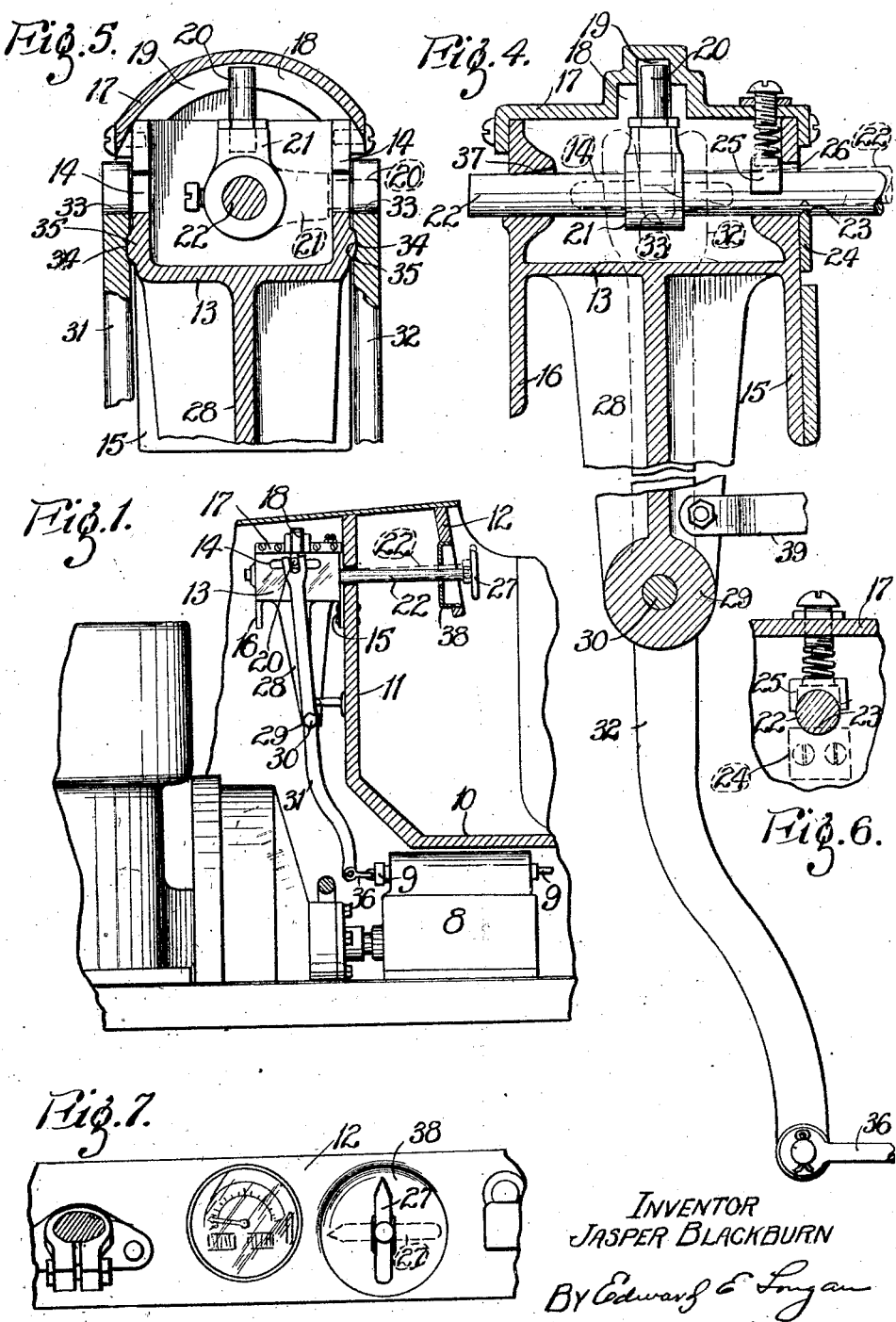
INVENTOR
JASPER BLACKBURN
By Edward E. Longan
ATTORNEY

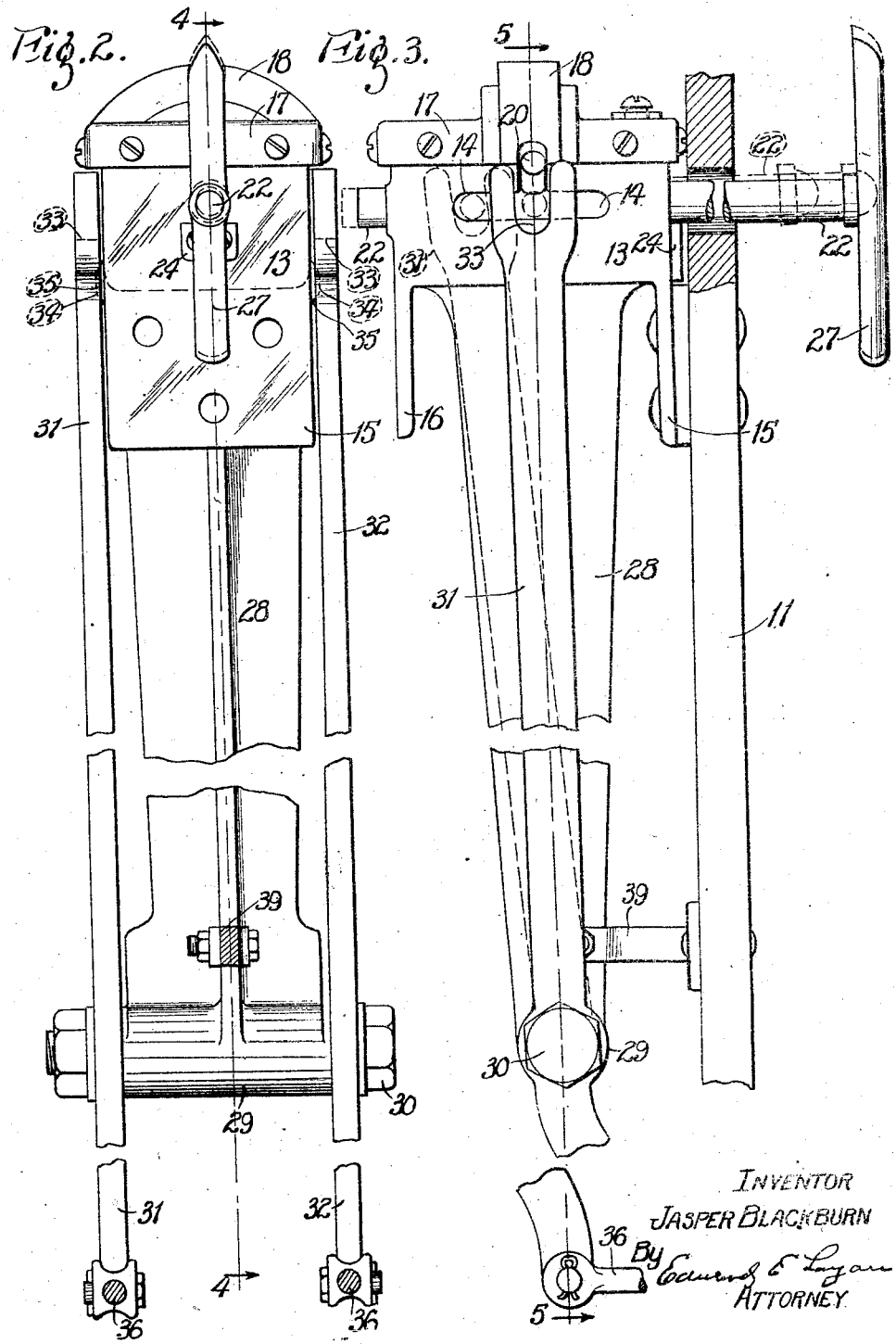

Patented Aug. 11, 1925.

1,549,707

UNITED STATES PATENT OFFICE.

JASPER BLACKBURN, OF WEBSTER GROVES, MISSOURI.

GEAR SHIFT.

Application filed October 29, 1923. Serial No. 671,397.

*To all whom it may concern:*

Be it known that I, JASPER BLACKBURN, a citizen of the United States, and resident of the city of Webster Groves, county of St. Louis, and State of Missouri, have invented certain new and useful Improvements in Gear Shifts, of which the following is a specification, containing a full, clear, and exact description, reference being had to the accompanying drawings, forming a part thereof.

My invention relates to improvements in Gear Shifts and has for its primary object, a gear shift, designed to operate the sliding gear transmission of an automobile, which is so constructed as to eliminate the usual shift lever which projects through the floor of the automobile, but still at the same time permit the gear selection and shifting to be performed by hand.

A further object is to construct a gear shift in which the operating parts are so positioned as not to interfere with the foot room in the front portion of an automobile. This permits the seating capacity of the automobile to be increased because three persons can occupy the front seat whereas with the ordinary gear shift lever which projects through the floor board, this is practically an impossibility because the knees of the person occupying the center of the seat are in continual danger of coming in contact with the shift lever thus preventing shifts from being readily made, and also quite frequently moving the lever so as to throw the gears out of mesh which might result in a serious accident, especially when going up or down hill.

In the drawings:—

Fig. 1 is a fragmental section of a portion of an automobile showing my device in position;

Fig. 2 is a front elevation of my device with portions broken away;

Fig. 3 is a side elevation of Fig. 2;

Fig. 4 is a fragmental vertical section taken on the line 4—4 of Fig. 2;

Fig. 5 is a cross section taken on the line 5—5 of Fig. 3;

Fig. 6 is an enlarged detailed view showing the manner of preventing vibration of the operating rod, and Fig. 7 is a fragmental view of an instrument board showing the appearance of my device when viewed in the inside of the car.

In the construction of my device 8 represents a sliding gear transmission which is of any standard construction. This transmission is provided with the usual shifter bars 9, as this construction is old, it will not be explained in detail. 10 represents the floor board of an automobile, 11 the dash, and 12 the instrument board. My improvement consists of a housing 13 which is provided on its sides with T-slots 14. The housing is provided at each end with depending flanges 15 and 16 which are provided with suitable openings so that by means of one of these flanges the housing may be secured to the dash board 11. The purpose of supplying two flanges, one on each end of the housing, is so that the housing may be secured either to the front or the rear of the dash board. In some automobiles the engine is set so close to the dash board as to preclude any possibility of placing the housing under the hood, in this instance, the housing 13 is secured to the dash board underneath the cowl by means of the flange 16.

The housing 13 is provided with a cover 17 which is provided with a central arcuate projection 18. The projection 18 is provided with an inner curved or arcuate channel 19 which permits the pin 20 carried by the sleeve 21 to pass therein. The sleeve 21 is mounted on the operating rod 22 which passes through the front and rear walls of the casing 13. The operating rod 22 is provided with a notch 23 which is designed to engage with a tooth 24 carried by the housing. This notch and tooth is to prevent accidental movement of the operating rod. The operating rod is held against the tooth 24 by means of a spring pressed pawl 25.

It will be noted from Fig. 4 that the opening 26 in the forward wall of the housing 13 is larger than the operating rod 22. In other words, this opening is preferably elongated vertically so that the rod 22 can be raised sufficient to disengage the notch 23 from the tooth 24. The operating rod projects forward and has secured to its free end a handle 27 by means of which the rod can be rotated as well as reciprocated. Formed integral with the housing 13 is a web 28, this web extends downwardly and terminates in a boss 29 through which a bolt 30 passes. This bolt is for the purpose of pivotally securing the shift levers 31 and 32. The upper ends of the shift levers 31 and 32 are bifurcated as at 33. The purpose of this bifurcation is to permit the entrance of the pin 20 by means of which the levers 31 and 32 are reciprocated when the handle 27 is pushed toward or moved away from the housing. The levers 31 and 32 are provided adjacent the bifurcation with recesses 34, which recesses are designed to receive projections 35 formed integral with the housing 13. These projections are adapted to engage with the recesses 34 when the levers 31 and 32 are in neutral position and to prevent accidental movement thereof due to road shocks, etc., there being sufficient spring in the shifting levers to permit the same being moved past the projections. Secured to the lower ends of the levers 31 and 32 are connecting links 36, the opposite ends of these links are connected to the respective shifter bars 9.

It will be noted from Fig. 4 that the rear end of the housing 13 is provided with an opening 37, this opening has its upper edge inclined so as to permit the raising of the operating rod 22 without binding.

The forward end of the operating rod 22 passes through a plate 38 which not only serves as a support for the forward end of the rod, but which also bears an indication showing when the device is set in neutral.

The lower end of the web 28 has secured thereto a bracket 39, this bracket is secured either to the dash board or other suitable part of the automobile and serves as a brace to stiffen the lower end of the web and relieve it to a great extent from strain while the shifting of gears is taking place.

The operation of my device is as follows:—

When it is desired to start the car, the standard gear shift being used, the handle is turned so that the upper or indicator hand points to the right, this rotates the shaft 22 and carries the pin 20 around in the recess 19 and permits it to enter the bifurcation 33 of the lever 32. The device is now ready for shifting. The handle 27 is lifted upward so as to clear the notch 23 and then pulled outward or toward the driver, this movement rocks the bar 32 on its pivot and the bolt 30 causing the upper end to also move toward the driver and the lower end away from the driver exerting a pull on one of the shifter bars 9 and meshing the desired gear. This movement also causes the bar 32 to spring away from the projection 35. When it is desired to again restore the transmission to neutral, the rod 22 is pushed inward until the projection 35 enters the recess 34. The handle can now be rotated so that the pin 20 will enter the bifurcation of the lever 32 and by repeating the lifting of the forward end of the rod 22 and moving the same either forward or backward, the desired gear can be meshed.

By the use of my device an automobile driver can tell instantly whether his car is in neutral or not by merely glancing at the handle 27 because it will be impossible to turn this handle into vertical position unless the gear transmission is in neutral position.

I do not desire to limit myself to the precise construction of operating handle shown nor the precise means of shifting gears as shown, as there are several other mechanisms by which my purpose can be accomplished without departing from the spirit of the invention.

Having fully described my invention, what I claim is:—

1. A gear shift comprising a housing having slotted sides, a boss integral with and below said housing, bifurcated levers pivotally secured intermediate their ends to said boss, said levers having their bifurcated ends opposite the slots and located on opposite sides of the housing, a rod rotatably and reciprocally mounted in the housing, means for rotating and reciprocating said rod, means carried by said rod and adapted to pass through the slots in the sides of the housing and engage with the bifurcation of a preselected lever for rocking the same when the rod is reciprocated, means for preventing the reciprocation of said rod when disconnected from the levers, means for preventing the rotation of the rod after engagement with a lever and when the same has been moved from neutral position, and a connection between said levers and the shifting elements of a sliding gear transmision.

2. A gear shift comprising a housing having openings in its sides, levers pivotally mounted intermediate their ends below said housing, said levers having their upper ends opposite said openings and located without and on opposite sides of the housing, their lower ends being connected to the shifting elements or a sliding gear transmission, a rod slidably and rotatably mounted in said housing, means carried by said rod and adapted to pass through said openings for engaging with a preselected lever so that the same will be rocked when the rod is reciprocated whereby a preselected shifting element is operated.

3. A gear shift comprising a housing having openings in its sides, levers pivotally mounted intermediate their ends below said housing, said levers having their upper ends opposite said openings and located on opposite sides of the housing, their lower ends being connected to the shifting elements of a sliding gear transmission, a rod slidably and rotatably mounted in said housing, means carried by said rod and adapted to pass through said openings for engaging with a preselected lever so that the same will be rocked when the rod is reciprocated whereby a preselected shifting element is operated, the openings and lever engaging means co-acting for preventing the rotation of the rod when a lever has been rocked.

4. A gear shift comprising a housing having openings in its sides, levers pivotally mounted below said housing and intermediate their ends, said levers having their upper ends opposite said openings and located on opposite sides of said housing, means for connecting the lower ends of said levers to the shifting elements of a sliding gear transmission, a rod slidably and rotatably mounted in said housing, means carried by said rod and adapted to pass through said openings for engaging with a preselected lever so that the same will be rocked when the rod is reciprocated whereby a preselected shifting element is operated, and a cover provided with a housing adapted to receive the lever engaging means when out of engagement with said levers and prevent the reciprocation of said rod secured to said housing.

In testimony whereof, I have signed my name to this specification.

JASPER BLACKBURN.